United States Patent
Ostadi

(10) Patent No.: US 10,050,286 B2
(45) Date of Patent: Aug. 14, 2018

(54) FUEL CELL FLOW PLATE

(71) Applicant: Intelligent Energy Limited, Loughborough (GB)

(72) Inventor: Hossein Ostadi, Loughborough (GB)

(73) Assignee: Intelligent Energy Limited, Loughborough (GB)

( * ) Notice: Subject to any disclaimer, the term of this patent is extended or adjusted under 35 U.S.C. 154(b) by 97 days.

(21) Appl. No.: 15/108,769

(22) PCT Filed: Dec. 17, 2014

(86) PCT No.: PCT/GB2014/053742
§ 371 (c)(1),
(2) Date: Jun. 28, 2016

(87) PCT Pub. No.: WO2015/101773
PCT Pub. Date: Jul. 9, 2015

(65) Prior Publication Data
US 2016/0329574 A1 Nov. 10, 2016

(30) Foreign Application Priority Data
Dec. 31, 2013 (GB) .................... 1323167.5

(51) Int. Cl.
*H01M 8/02* (2016.01)
*H01M 8/0228* (2016.01)
*H01M 8/0213* (2016.01)
*H01M 8/0221* (2016.01)
*H01M 8/0226* (2016.01)
*H01M 8/0206* (2016.01)

(52) U.S. Cl.
CPC ....... *H01M 8/0228* (2013.01); *H01M 8/0206* (2013.01); *H01M 8/0213* (2013.01); *H01M 8/0221* (2013.01); *H01M 8/0226* (2013.01); *Y02P 70/56* (2015.11)

(58) Field of Classification Search
CPC ............. H01M 8/0228; H01M 8/0206; H01M 8/0213; H01M 8/0221; H01M 8/0226; Y02P 70/56
See application file for complete search history.

(56) References Cited

U.S. PATENT DOCUMENTS 5,300,340 A * 4/1994 Calhoun .................... C09J 7/02
428/144
5,670,251 A * 9/1997 Difrancesco .............. B32B 5/16
428/325
(Continued)

FOREIGN PATENT DOCUMENTS

CN 101872862 A 10/2010
CN 103401003 A 11/2013
(Continued)

OTHER PUBLICATIONS

Machine translation of the detailed description of KR 2010-0127577A (Year: 2010).*
(Continued)

*Primary Examiner* — Gregg Cantelmo
(74) *Attorney, Agent, or Firm* — Baker & Hostetler LLP

(57) ABSTRACT

A fuel cell flow plate having a first layer (12) comprising an electrically conductive hydrophobic layer; and a second layer (13) comprising a graphene coating.

12 Claims, 1 Drawing Sheet

(56) References Cited

U.S. PATENT DOCUMENTS

Figure 1:
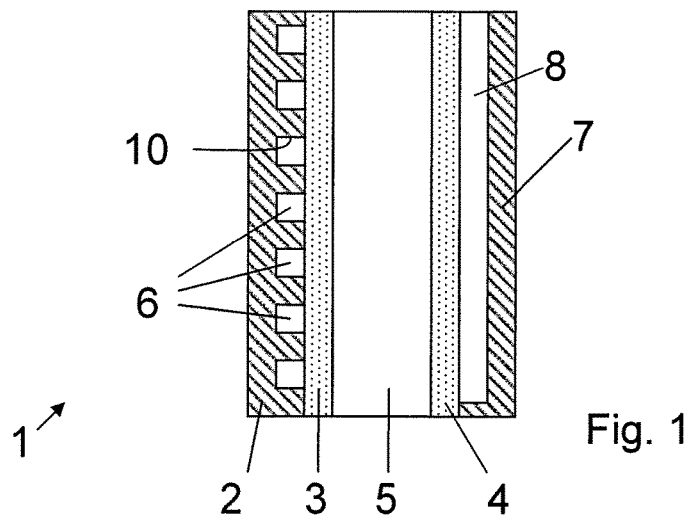

| | | |
|---|---|---|
| 2002/0180094 A1 | 12/2002 | Gough |
| 2005/0062024 A1 | 3/2005 | Bessette |
| 2005/0189673 A1 | 9/2005 | Klug et al. |
| 2006/0060296 A1* | 3/2006 | Sigler ............... B32B 37/12 156/272.2 |
| 2007/0065703 A1* | 3/2007 | Abd Elhamid ..... H01M 8/0284 429/435 |
| 2008/0149900 A1 | 6/2008 | Jang et al. |
| 2008/0268318 A1 | 10/2008 | Jang et al. |
| 2010/0028749 A1 | 2/2010 | Dadheech |
| 2011/0123776 A1* | 5/2011 | Shin ..................... C23C 16/26 428/172 |
| 2011/0300338 A1 | 12/2011 | Shin et al. |
| 2012/0326128 A1 | 12/2012 | Shin et al. |
| 2013/0236810 A1 | 9/2013 | Jiang et al. |

FOREIGN PATENT DOCUMENTS

| | | |
|---|---|---|
| KR | 10-2010-0127577 A | 12/2010 |
| KR | 2010027577 A * | 12/2010 |
| WO | WO 2010/144457 A2 | 12/2010 |
| WO | WO-2013075032 A1 * | 5/2013 .......... H01M 8/2465 |

OTHER PUBLICATIONS

Great Britain Patent Application No. 1323167.5; Search Report; dated Jul. 1, 2014; 5 pages.
International Patent Application No. PCT/GB2014/053742; Int'l Preliminary Report on Patentability; dated Jul. 5, 2016; 10 pages.
Rafiee et al.; "Wetting transparency of graphene"; Nature Materials Letters; vol. 11; Mar. 2012; p. 217-222.
"Graphene Coated SS BiPolar Plates"; SureChem; USPTO pub No. 20100028749; www.surechem.org; 2011; accessed Apr. 11, 2013; 3 pages.
"3M™ Electrically Conductive Adhesive Transfer Tape 9703"; Technical Data; Apr. 2011; 5 pages.
International Search Report and Written Opinion dated Mar. 24, 2015, in International Application No. PCT/GB2014/053742.

* cited by examiner

US 10,050,286 B2

FUEL CELL FLOW PLATE

CROSS-REFERENCE TO RELATED APPLICATIONS

This patent application is a U.S. National Stage Patent Application of International Patent Application PCT/GB2014/053742 filed Dec. 17, 2014, which claims priority to Great Britain Patent Application GB1323167.5 filed Dec. 31, 2013, the disclosures of which are incorporated by reference in their entirety.

This invention relates to a fuel cell flow plate. It also relates to a method of manufacturing a flow plate.

Conventional electrochemical fuel cells convert fuel and oxidant, generally both in the form of gaseous streams, into electrical energy and a reaction product. A common type of electrochemical fuel cell for reacting hydrogen and oxygen comprises a polymeric ion (proton) transfer membrane, with fuel and air being passed over respective sides of the membrane. Protons (that is, hydrogen ions) are conducted through the membrane, balanced by electrons conducted through a circuit connecting the anode and cathode of the fuel cell. The fuel is directed over the anode by a flow plate. The oxidant is directed over the cathode by a flow plate. A fuel cell stack may be formed comprising a number of such membranes and flow plates. Water, reaction by-products or other contaminants can collect in channels in the flow plate.

According to a first aspect of the invention we provide a fuel cell flow plate having:
 a first layer comprising an electrically conductive hydrophobic layer; and
 a second layer comprising a graphene coating.

This is advantageous as the graphene coating provides in-plane electrical conductivity and corrosion resistance but has high wetting transparency. This allows the hydrophobic property of the first layer to present itself at the surface of the fuel cell flow plate through the graphene coating. The fuel cell flow plate is therefore conductive for efficient transfer of power through the fuel cell and hydrophobic to assist in water management.

The first layer may be anisotropically electrically conductive.

The first layer may lie in a plane on the fuel cell flow plate and be electrically conductive through the plane and less conductive in the plane. The first layer may be non-conductive or insulating in the plane. This is advantageous as the first layer allows current to flow "through plane" (i.e. along a Z axis perpendicular to the plane of the layer) but not "in plane" (i.e. in the X and Y directions).

The first layer may comprise a polymer having conductive particles dispersed therein. The first layer may comprise a tape, such as an acrylic tape. The tape may include a pressure sensitive adhesive. This is advantageous for securing the tape to the fuel cell flow plate.

The second layer may comprise a graphene coating less than ten graphene layers, six graphene or four graphene layers thick. Thus the second layer may be less than ten, six or four atoms thick.

The first layer may be hydrophobic with a contact angle of greater than 90°.

The fuel cell flow plate may be of metal and the first layer may be disposed thereon with the second layer coating the first layer.

The fuel cell flow plate may comprise an anode flow plate.

According to a further aspect of the invention we provide a fuel cell or fuel cell stack including a flow plate as defined in the first aspect of the invention.

According to a further aspect of the invention we provide a method of manufacturing a fuel cell flow plate comprising the steps of;
 receiving a flow plate base;
 receiving a first layer comprising an electrically conductive hydrophobic layer;
 receiving a second layer comprising a graphene coating;
 forming a fuel cell flow plate by applying the first and second layers to the flow plate base.

The first layer may comprise an adhesive tape and the method may include applying the tape to the fuel cell flow plate base, which may be of metal.

The method may include the step of applying the graphene coating to the tape prior to applying the tape to the flow plate base. Alternatively, the method may include the step of receiving a graphene coated tape or coating the tape with graphene.

Figure 2:
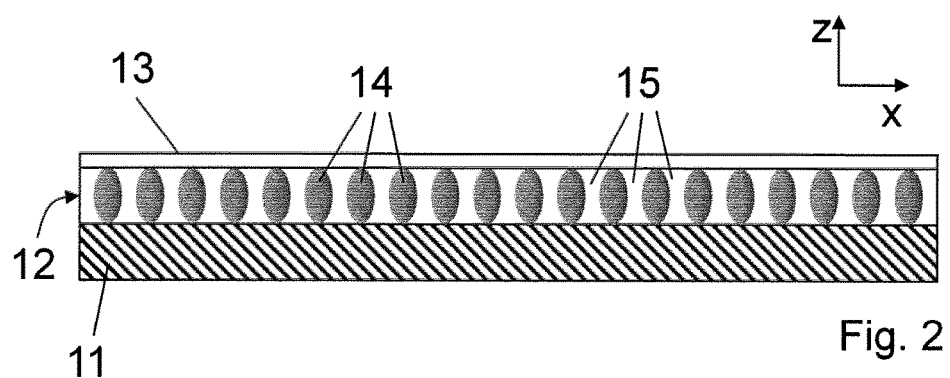
Figure 3:
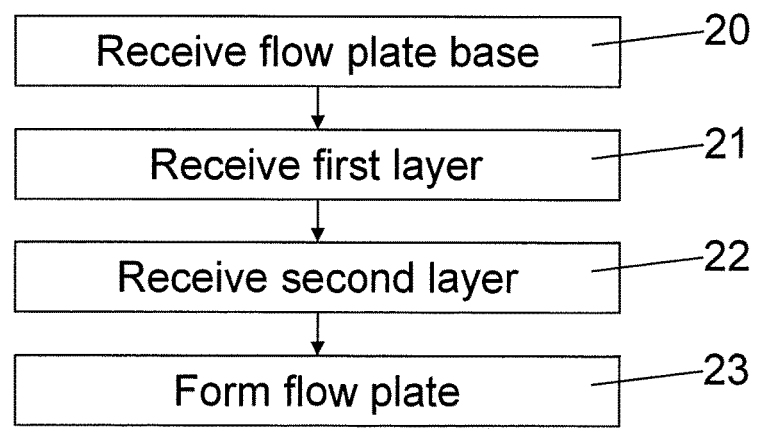

There now follows, by way of example only, a detailed description of embodiments of the invention with reference to the following figures, in which:

FIG. 1 shows fuel cell including a fuel cell flow plate;
 FIG. 2 shows the fuel cell flow plate with a first and second layer applied to a base; and
 FIG. 3 shows a flow chart illustrating an example of a method of manufacturing the fuel cell flow plate.

The example embodiments discussed herein relate to a proton exchange membrane fuel cell, although the invention may be used in other types of fuel cell. FIG. 1 shows a fuel cell 1 having a fuel cell flow plate 2. The fuel cell 1 includes an anode 3 and a cathode 4 separated by a proton exchange membrane 5. The fuel cell flow plate 2 includes channels 6 for directing a fuel to the anode 3 and may therefore be termed an anode fuel cell flow plate. A further flow plate 7 or cathode fuel cell flow plate is provided which includes channels 8 for directing an oxidant to the cathode 4. The fuel cell 1 may be part of a fuel cell stack comprising a plurality of fuel cells that are stacked and electrically connected together. In a fuel cell stack, the fuel cell flow plates 2, 7 may be bipolar, in which one side of the plate includes channels for directing fuel to an anode of a particular cell in the stack and the other side includes channels for directing oxidant to a cathode of an adjacent cell in the stack. Thus, the function of the anode fuel cell flow plate 2 and the cathode fuel cell flow plate 7 are integrated into a single bipolar plate that serves adjacent fuel cells in the stack.

The channels 6 are formed in a side 10 of the anode fuel cell flow plate 2 that faces the anode 3. FIG. 2 shows a detailed view of the side 10 of the flow plate 2. The flow plate 2 comprises a flow plate base 11, a first layer 12 and a second layer 13. The second layer 13 faces into the channels 6.

The flow plate base 11 is of metal, such as stainless steel. The first and second layers 12 and 13 may extend over the whole side 10 or the whole plate 2, part of the side 10 or plate 2, in a particular pattern over the side 10 or plate 2 or in any other arrangement. For example, the first and second layers 12 and 13 may extend over only the parts of the plate 2 in which the channels 6, 8 are formed.

The first layer 12 is electrically conductive and hydrophobic. The layer is approximately two millimeters thick, but in other embodiments may be thinner or thicker. The first layer 12 is applied to the flow plate base 11 such that it extends over its surface where required. The first layer 12 may be in the form of a tape comprising a polymer having adhesive to secure it to the flow plate base 11. The tape may be of an acrylic material and more particularly an acrylic adhesive. The adhesive may be pressure sensitive. The first layer 12 may comprise Electrically Conductive Adhesive Transfer Tape 9703 manufactured by 3M company, for example.

The first layer 12 has a hydrophobicity such that the contact angle is greater than 90°. In other embodiments, the first layer is more hydrophobic and may have a contact angle greater than 100°, 110°, 120°, 130°, 140°, 150° or more.

The first layer 12 is anisotropically electrically conductive. In particular, the first layer is electrically conductive in a direction perpendicular to the plane in which it lies. Thus, the first layer 12 is electrically conductive through the thickness of the layer 12 in a direction of a z-axis as shown in FIG. 2. The first layer includes conductive particles 14 within the polymer or acrylic adhesive that provide conductivity through the layer but the conductive particles 14 are spaced apart sufficiently that the first layer is not conductive in the plane of the layer, the plane extending over the x-axis shown in FIG. 2 and a y-axis that extends out of the page. The acrylic adhesive is an insulator in the plane of the layer. Gaps 15 of polymer between the conductive particles 14 provide the non-conductive "in plane" properties of the layer. The first layer 12 may have a contact resistance of less than 0.5 ohms or less than 0.3 ohms (gold polyimide flex onto gold PCB, contact area 6 $mm^2$) through-plane and may have a resistivity of less than 0.5 ohms cm. The sheet resistance or insulation resistance in-plane of the layer may be at least $10^6$ ohms/square or $10^8$ ohms/square or $10^{10}$ ohms/square and may be approximately $3.4 \times 10^{14}$ ohms/square.

The second layer 13 is applied to the first layer 12 on an opposite side to that secured to the flow plate base 11. The second layer 13 may be applied to the first layer 12 before the first layer 12 is itself applied to the flow plate base 11. Thus, a graphene coated polymer tape may be applied to the flow plate base 11. Alternatively, the second layer 13 may be applied to the first layer 12 after the first layer has been applied to the flow plate base 11.

The second layer comprises a graphene coating on the first layer 12. The second layer may extend over the whole or part of the first layer. The graphene coating may be less than ten graphene layers thick. In the present embodiment the graphene coating is between one and six graphene layers thick. The graphene coating 13 is electrically conductive and provides an electrical connection between the conductive particles 14 of the first layer 12. The graphene coating is transparent to the hydrophobic properties of the first layer 12. Thus, the graphene coating can provide a greater electrical conductivity than the first layer below and does not substantially interfere with the hydrophobicity of the first layer 12. Therefore, the surface of the fuel cell flow plate 2 is electrically conductive (due to the graphene coating 13 and conductive particles 14) and hydrophobic (due to the first layer 12). This combination of features is advantageous for water management within the anode channels 6. Any water than collects in the anode channels 6 will lie on the hydrophobic flow plate surface, which makes it easy to flush the water out of the channels 6 with the fuel flow or a purge gas.

FIG. 3 shows a flow chart which represents an example method of receiving a fuel cell flow plate base at step 20. The method further comprises receiving a first layer comprising an electrically conductive hydrophobic layer at step 21. The method further comprises receiving a second layer comprising a graphene coating at step 22. The first layer may be received with the second layer applied to it and therefore step 21 and step 22 would be combined. Thus, the method may include the step of receiving a graphene coated tape, which comprises the first and second layers. The method includes the step of forming a fuel cell flow plate by applying the first and second layers to the flow plate base at step 23. The first layer may comprise an adhesive tape and therefore forming the fuel cell flow plate may comprise using the adhesive tape to apply the first and second layers to the flow plate base.

The fuel cell flow plate described above has the first and second layers applied to an anode flow plate. However, the layers could be applied to a cathode flow plate. Further the layers could be applied to one or more sides of a bipolar flow plate.

The invention claimed is:

1. A fuel cell flow plate comprising:
    a flow plate base;
    a first layer comprising an electrically conductive hydrophobic layer including a polymer having conductive particles dispersed therein; and
    a second layer comprising a graphene coating of less than ten graphene layers;
    wherein the first layer is disposed between the flow plate base and the second layer, the first layer is arranged in a plane on the fuel cell flow plate and the first layer is conductive in the direction through the plane and less conductive in the direction in the plane.

2. A fuel cell flow plate according to claim 1, wherein the first layer is anisotropically electrically conductive.

3. The fuel cell flow plate according to claim 1, wherein the first layer is non-conductive in the plane.

4. The fuel cell flow plate according to claim 1, wherein the first layer comprises an acrylic tape.

5. The fuel cell flow plate according to claim 4, wherein the acrylic tape includes a pressure sensitive adhesive.

6. The fuel cell flow plate according to claim 1, wherein the first layer is hydrophobic with a contact angle of greater than 90°.

7. The fuel cell flow plate according to claim 1, wherein the fuel cell flow plate base is of metal.

8. The fuel cell flow plate according to claim 1, wherein the fuel cell flow plate is an anode flow plate configured to direct fuel to an anode in a fuel cell.

9. A fuel cell including the fuel cell flow plate according to claim 1.

10. A method of manufacturing a fuel cell flow plate comprising the steps of:
    receiving a flow plate base;
    receiving a first layer comprising an electrically conductive hydrophobic layer including a polymer having conductive particles dispersed therein;
    receiving a second layer comprising a graphene coating; and
    forming a fuel cell flow plate by applying the first and second layers to the flow plate base.

11. The method of claim 10, wherein the first layer comprises an adhesive tape and the method includes the step of applying the adhesive tape to the flow plate base.

12. The method of claim 11, wherein the method includes the step of applying the graphene coating to the adhesive tape prior to applying the adhesive tape to the flow plate base.

* * * * *